(12) United States Patent
Ragazzini et al.

(10) Patent No.: US 7,458,299 B2
(45) Date of Patent: Dec. 2, 2008

(54) CENTERING DEVICE FOR THE GUIDED TRANSFER OF BARS FROM A FEEDER TO A LATHE

(75) Inventors: Massimo Ragazzini, Faenza (IT); Renzo Romagnoli, Faenza (IT)

(73) Assignee: Iemca Giuliani Macchine Italia S.p.A., Faenza (IT)

( * ) Notice: Subject to any disclaimer, the term of this patent is extended or adjusted under 35 U.S.C. 154(b) by 167 days.

(21) Appl. No.: 11/284,960

(22) Filed: Nov. 23, 2005

(65) Prior Publication Data

US 2006/0107803 A1 May 25, 2006

(30) Foreign Application Priority Data

Nov. 25, 2004 (IT) .......................... BO2004A0732

(51) Int. Cl.
 *B23B 13/00* (2006.01)
 *B23B 15/00* (2006.01)
(52) U.S. Cl. .............................. 82/124; 82/150; 82/170; 82/903
(58) Field of Classification Search .................... 82/124, 82/127, 142, 150, 170, 903; B23B 13/00
See application file for complete search history.

(56) References Cited

U.S. PATENT DOCUMENTS

| | | | |
|---|---|---|---|
| 2,944,454 A * | 7/1960 | Vasselli ........................ 82/15 |
| 3,525,277 A | 8/1970 | Jeanpretre et al. |
| 3,815,930 A * | 6/1974 | Mattes ......................... 279/50 |
| 3,937,054 A * | 2/1976 | Hortvet et al. ................ 72/393 |
| 4,058,036 A * | 11/1977 | Austin .......................... 82/163 |
| 5,910,200 A * | 6/1999 | Cucchi ......................... 82/126 |
| 6,575,063 B1 * | 6/2003 | Inaba ........................... 82/127 |
| 2007/0199415 A1 * | 8/2007 | Ando et al. ................... 82/127 |

FOREIGN PATENT DOCUMENTS

| | | |
|---|---|---|
| DE | 607 888 C | 1/1935 |
| WO | WO 9741987 A1 * | 11/1997 |

* cited by examiner

*Primary Examiner*—Boyer D. Ashley
*Assistant Examiner*—Sara Addisu
(74) *Attorney, Agent, or Firm*—Modiano & Associati; Albert Josif; Daniel J. O'Byrne

(57) ABSTRACT

A centering device for the guided transfer of bars from a feeder to a lathe, and interposed therebetween aligned with a bar guide with the mandrel of the lathe, comprising: a bush for fixing to a fixing seat and rigidly coupled to a bar opening aligned with the respective bar guide and with the mandrel of the lathe; a tubular body, rigidly coupled to the bush coaxial thereto and provided with a housing seat for a ring with oscillating elements which are pivoted to a respective fixed anchoring element with one end and are retained in mutual contact by elastic elements, delimiting a through opening whose diameter is about as long as the diameter of a bar. The ring and the anchoring element are axially movable within the seat, in contrast to springs toward the lathe.

13 Claims, 2 Drawing Sheets

# CENTERING DEVICE FOR THE GUIDED TRANSFER OF BARS FROM A FEEDER TO A LATHE

The present invention relates to a centering device for the guided transfer of bars from a feeder to a lathe.

BACKGROUND OF THE INVENTION

Usually, bars which must be machined with a lathe are fed to the machine tool by a feeder which is adapted to contain a plurality of bars in order to provide optimum automation of the production cycle.

The bar, after insertion in the feeder, is located within a respective guide and is subjected to an axial translational motion by a pusher, which can be associated with the end portion of such bar. The pusher pushes the bar out of the feeder (through an appropriately provided opening in the front face of said feeder) until such bar is inserted in the mandrel of the lathe.

The pusher is designed to retain the rear end of the bar, also in order to recover the portion of the bar that is not machined and carry it toward the feeder for expulsion.

For this purpose, the pusher is normally provided with an elastic element, typically provided as an elastic ring, which is adapted to retain the rear end of the bar. The outside diameter of such elastic element may be greater than the diameter of the bar, and therefore the guiding elements located between the feeder and the lathe, and possibly in the mandrel of the lathe, may have a substantially larger inside diameter than the bar in order to allow the passage of the pusher and of the element for gripping the rear end of the bar.

The radial play produced between the bar and the elements for guiding between the feeder and the lathe, within the mandrel, and possibly also within the feeder, is such as to allow oscillations of the bar which are limited only by the rigidity of the clamping member of the grip element (collet) of the lathe mandrel, by the rigidity of the bar itself, by the rear grip of the elastic element of the pusher, and possibly by the feeder guiding elements (if they are of the type which can be adjusted dynamically to the diameter of the bar), but allows more or less substantial vibrations caused by the rotation of the bar during the machining of the front end of said bar.

These vibrations can have a negative effect on the machining of the part, in the form of finish defects or even dimensional defects, and in general limit the rotation rate to levels at which the effects can be considered negligible.

SUMMARY OF THE INVENTION

The aim of the present invention is to obviate the above-cited drawbacks and meet the mentioned requirements, by providing a centering device for the guided transfer of bars from a feeder to a lathe which allows to limit the vibrations of the rotating bar and if possible increase the rotation rate of such bar.

Within this aim, an object of the present invention is to provide a centering device which is simple, relatively easy to provide in practice, safe in use, effective in operation, and has a relatively low cost.

This aim and this and other objects that will become better apparent hereinafter are achieved by the present centering device for the guided transfer of bars from a feeder to a lathe, of the type interposed between said feeder and said lathe and aligned with a respective guide for the bars of said feeder and with the lathe mandrel, characterized in that it comprises: a structure for fixing to an element which is rigidly coupled to a structure which is constantly aligned with the opening from which the bar enters the lathe, and is aligned with the respective bar guide and with the lathe mandrel; a substantially tubular body, which is rigidly coupled to said structure and is coaxial thereto and is provided with a seat for a ring of oscillating elements which are pivoted to a respective fixed anchoring element with one of their ends and are retained in mutual contact by respective elastic means, delimiting a through opening whose diameter is substantially not smaller than the diameter of a bar, said ring and said fixed anchoring element being axially movable within said seat, by forcing at least one elastic element for positioning them, from the bottom of said seat toward said lathe.

BRIEF DESCRIPTION OF THE DRAWINGS

Further characteristics and advantages of the present invention will become better apparent from the following detailed description of a preferred but not exclusive embodiment of a device for the guided transfer of bars from a feeder to a lathe, illustrated by way of non-limiting example in the accompanying drawings, wherein.

DESCRIPTION OF THE PREFERRED EMBODIMENTS

Figure 1:
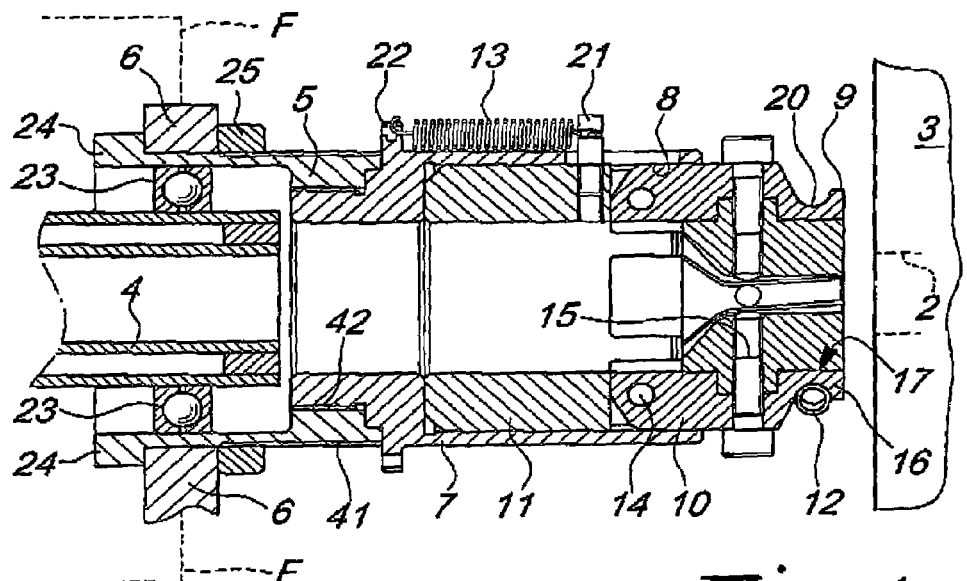
FIG. 1 is a sectional view, taken along a longitudinal plane, of a first embodiment of a device according to the invention.
Figure 2:
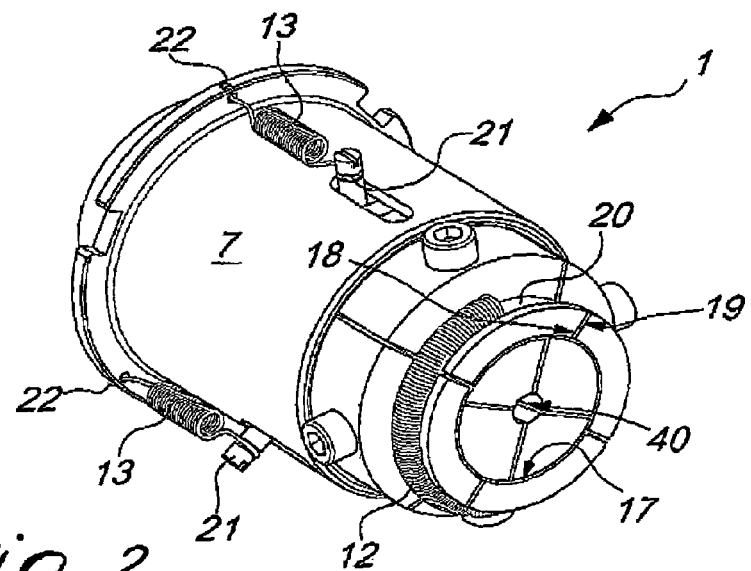
FIG. 2 is a perspective view of a first embodiment of a device according to the invention.
Figure 3:
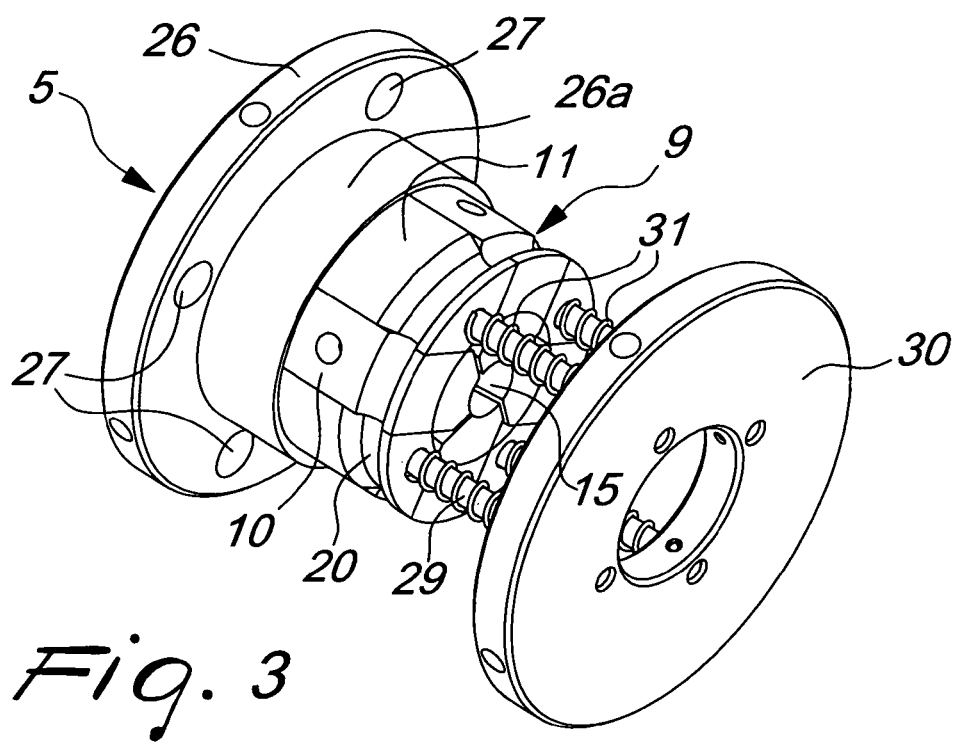
FIG. 3 is a perspective view of a second embodiment of a device according to the invention.
Figure 4:
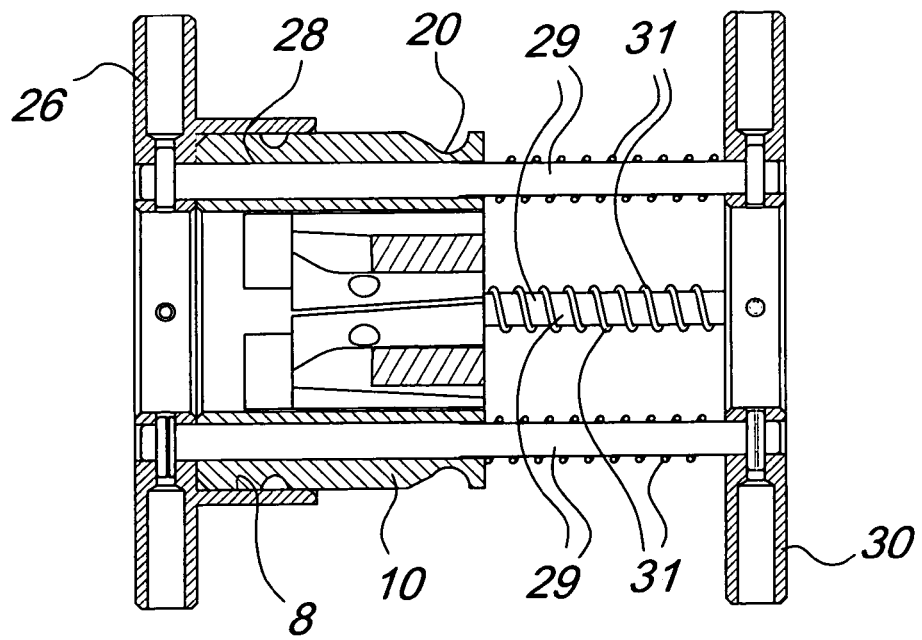
FIG. 4 is a sectional view, taken along a longitudinal plane, of a second embodiment of a device according to the invention.

With reference to the figures, the reference numeral 1 generally designates a centering device for the guided transfer of bars from a feeder to a lathe.

The centering device 1 is normally interposed between a feeder and a bar insertion opening 2 of a lathe 3 and is aligned with a respective feeder bar guide 4.

The device 1 comprises a bush element 5 for fixing to a fixing seat element 6, which can be, for example, either the hole of a feeder through which the bar exits from the feeder F located upstream of a supporting structure, or a hole provided within the lathe 3, on a fixed element or on an element which is rigidly coupled to the mandrel drum of the lathe 3 (such as for example the rear driving disk or intermediate supporting disk of the device known as countercollet for the advancement of the lathe 3) in the case of a multimandrel lathe 3, and is in any case aligned with the respective bar guide 4 and with the mandrel of the lathe 3. The device 1 also comprises a substantially tubular body 7, which is rigidly coupled to the bush 5 and coaxial thereto and is provided, at the opposite end with respect to the end for anchoring to the bush 5, with a housing seat 8 for a ring 9 of oscillating elements 10, which are pivoted to a respective fixed anchoring element 11 with one of their ends and are retained in mutual contact by respective elastic means 12, delimiting a through opening 40 whose diameter is not smaller than the diameter of a bar.

The ring 9 and the fixed anchoring element 11 can move axially within the housing seat 8 until they exit completely from it: this requires an external axial action, which forces the plurality of elastic positioning elements 13 designed to keep the ring 9 rested against the bottom of the seat 8.

The oscillating elements 10 are shaped substantially like tiles which are pivoted to the fixed anchoring element 11 at the first end 14 that lies opposite with respect to the second end provided with a protrusion 15 that may be provided by a protruding screw, bolt or by a pin inserted in element 10 or provided monolithic threwith. A terminal region of the oscillating elements 10 constituted by a portion 16 that is arranged beyond the protrusion 15 forms, in its end region, a shaped opening 17 which is substantially formed by quarter circles delimited between two respective linear connecting sides 18 and 19.

The elastic means are constituted by an elastic annular body 12, which is fitted above the ring 9 of oscillating elements 10 in a respective groove 20 provided on their outer side proximate to the corner region 15.

The at least one elastic positioning element is an axially-acting spring 13, which is interposed between a respective pivot 21, which is rigidly coupled to the ring 9, and a fixed protrusion 22, which is rigidly coupled to the tubular element 7.

The bush element 5 for fixing to the seat 6 is rigidly coupled at the hole from which the bar exits from the feeder 2 and accommodates internally a portion 4 for guiding the bar, optionally with the interposition of bearings 23.

The bush 5 has a terminal shoulder 24, which has a larger diameter than the seat 6 in which it is fixed, and an external thread 41 for the engagement of an annular element 25: when the bush 5 is mounted on the seat 2, the walls of the fixing seat 6 are clamped between the shoulder 24 and the annular element 25.

The bush 5 has, at its end portion, an apparatus for coupling to the tubular body 7, that is constituted by an internal thread 42 which is complementary with respect to a corresponding external thread of the tubular element 7 for mutual engagement.

The tubular element 7 has a plurality of radial protrusions 22 for fixing the axially-acting springs 13.

According to an embodiment which is alternative to the one described above, the bush element 5 has a terminal disk 26 provided with a plurality of holes 27 for fixing to the fixing seat 6 by means of respective bolts and a plurality of cylindrical seats 28 for corresponding shafts 29 which are perpendicular to the disk 26 to which they are fixed. The tubular body 7 is constituted by a cylindrical portion 26a of the structure 5.

The ring 9 of oscillating elements 10 is crossed by the shafts 29 and can slide thereon.

The respective free ends of the shafts 29 are rigidly coupled to a contrast disk 30, which can be fixed to the front wall of the lathe 3: the elastic positioning element 13 is constituted by at least one axially-acting spring 31, which is arranged on the portion of each shaft that is delimited between the ring 9 and the contrast disk 30. In a different embodiment the elastic positioning elements may be provided by a plurality of laminas arranged on the outer lateral surface of the device 1 and have a first respective end rigidly coupled to the tubular body 7 and a second, opposite end which is free and elastically forced on the outer surface of the ring 9.

The operation of the device according to the invention is as follows: when a bar arrives from the feeder, it passes through the centering device 1 until it reaches the collet of the mandrel of the lathe. In the portion of the stroke comprised between the terminal end of the feeder and the initial end of the lathe 3, the bar is supported and guided by the element 1, ensuring the necessary correct alignment. The limited play between the passage delimited by the oscillating elements 10 in the inactive position and the bar ensures limited possibilities of oscillation of the bar (since the diameter of the through hole 40 being "substantially" as long as that of a bar) and a consequent reduction of vibrations during the rotation of such bar.

When the pusher that retains the rear end part of the bar with an appropriately provided elastic element thereof has to pass through the centering device, since the elastic element of the pusher has a larger diameter than the passage 40 delimited by the ring 9 of oscillating elements 10, it forces the translational motion of the ring 9 and of the element 11 to which the ring is connected, forcing the elastic elements 13 in an axial direction, up to the position in which the radial opening of the oscillating elements 10 is allowed, forcing the elastic element 12 in a radial direction. When opening occurs, the pusher can pass through the centering element 1 and continue the advancement stroke toward the lathe.

The pusher, once it has passed through the centering device, is also supported and guided by such device, which ensures a better alignment thereof with the mandrel of the lathe 3.

It has thus been shown that the invention achieves the intended aim and objects.

The invention thus conceived is susceptible of numerous modifications and variations, all of which are within the scope of the appended claims.

All the details may further be replaced with other technically equivalent ones.

In the embodiments shown, individual characteristics, given in relation to specific examples, may actually be interchanged with other different characteristics that exist in other embodiments.

Moreover, it is noted that anything found to be already known during the patenting process is understood not to be claimed and to be the subject of a disclaimer.

The embodiment of the present invention shall be carried out in the most scrupulous compliance with the statutory and regulatory provisions related to the products of the invention or correlated thereto and following any required authorization of the corresponding competent authorities, with particular reference to regulations related to safety, environmental pollution and health.

In practice, the materials used, as well as the shapes and the dimensions, may be any according to requirements without thereby abandoning the scope of the protection of the appended claims.

The disclosures in Italian Patent Application No. BO2004A000732 from which this application claims priority are incorporated herein by reference.

What is claimed is:

1. A centering device for guided transfer of bars from a feeder to a lathe, that is interposable between the feeder and the late in alignment with a bar guide of the feeder and with a mandrel of the lathe, the device comprising: a supporting structure which is constantly aligned with an opening of the lathe from which a bar enters therein, with a bar guide of the feeder, and with a mandrel of the lathe; a bush element for fixing to a fixing seat which is rigidly coupled to said supporting structure; a substantially tubular body, which is rigidly coupled to said bush element, coaxial thereto and is provided with a housing seat, fixed anchoring elements supported by said tubular body; elastic means; elastic positioning elements acting between said bush element and said tubular body; and a ring accommodated in said seat and comprising oscillating elements that are shaped like tiles which are each pivoted to a respective one of said fixed anchoring elements with a first end thereof and are retained in mutual contact by said elastic means acting radially at a second end thereof so as to delimit a through opening whose diameter is substantially as long as and in any case not smaller than a diameter of a bar to be transferred, said ring and said fixed anchoring elements being axially movable within said housing seat until their complete exit therefrom, by forcing in an axial direction at least one of said elastic positioning elements for positional movement of said ring and anchoring elements from a bottom of said housing seat toward the late.

2. The centering device of claim 1, wherein said oscillating elements that are substantially shaped like tiles and are pivoted at the respective first end which is opposite with respect to the second end which is provided with a protrusion, a terminal region of the oscillating elements located beyond said protrusion providing a shaped opening which is substantially formed by circular sectors delimited between respective linear connecting portions.

3. The centering device of claim 2, comprising an annular element, said bush element comprising a terminal shoulder which has a larger diameter than a diameter of a hole of said fixing seat and an external thread for engaging said annular element, whereby said fixing seat is clamped between said shoulder and said annular element upon fixing of said bush element on said fixing seat.

4. The centering device of claim 3, wherein said bush element has, at an end portion thereof, an apparatus for coupling to said tubular body.

5. The centering device of claim 4, wherein said tubular body comprises a plurality of radial protrusions for fixing said at least one elastic positioning element.

6. The centering device of claim 2, wherein said elastic means is constituted by an elastic annular body, which is mounted on said ring comprising said oscillating elements in a respective groove provided on an outer side of the ring proximate to the terminal end thereof.

7. The centering device of claim 2, wherein said elastic means is constituted by a plurality of laminas, which are arranged along the outer lateral surface of the device and have a respective first end rigidly coupled to said tabular body and a second, opposite end which is free and elastically forced on an outer surface of said ring comprising the oscillating elements.

8. The centering device of claim 5, wherein said at least one elastic positioning element is constituted by an axially-acting spring, which is interposed between a respective pivot rigidly coupled to said ring, and a said radial protrusion, which is rigidly coupled to said tubular element.

9. The centering device of claim 2, wherein said bush element comprises a terminal disk provided with a plurality of holes for fixing to said fixing seat by way of respective bolts and a plurality of cylindrical seats for corresponding shafts which are perpendicular to said terminal disk, to which said shafts are fixed.

10. The centering device of claim 9, wherein said ring comprising oscillating elements is crossed by said shafts and is slideable thereon.

11. The centering device of claim 10, in combination with a contrast disk and axially-acting springs, wherein said shafts have respective free ends which are rigidly coupled to said contrast disk, said axially-acting springs being inserted, and constituting an elastic positioning element on a portion of each shaft delimited between said ring and said contrast disk.

12. A centering device for guided transfer of bars from a feeder to a lathe, that is interposable between the feeder and the lathe in alignment with a bar guide of the feeder and with a mandrel of the lathe, the device comprising: a supporting structure which is constantly aligned with an opening of the lathe from which a bar enters therein, with a bar guide of the feeder, and with a mandrel of the lathe; a bush element for fixing to a fixing seat which is rigidly coupled to said supporting structure; a substantially tubular body, which is rigidly coupled to said bush element, coaxial thereto and is provided with a housing seat, fixed anchoring elements supported by said tubular body; elastic means; elastic positioning elements acting between said bush element and said tubular body; and a ring accommodated in said seat and comprising oscillating elements, which are each pivoted to a respective one of said fixed anchoring elements with a first end thereof and are retained in mutual contact by said elastic means so as to delimit a through opening whose diameter is substantially as long as and in any case not smaller than a diameter of a bar to be transferred, said ring and said fixed anchoring elements being axially movable within said housing seat, by forcing at least one of said elastic positioning elements for positional movement of said ring and anchoring elements from a bottom of said housing seat toward the lathe, and wherein said oscillating elements are substantially shaped like tiles that are pivoted at the respective first end which is opposite with respect to a second end which is provided with a protrusion, a terminal region of the oscillating elements located beyond said protrusion providing a shaped opening which is substantially formed by circular sectors delimited between respective linear connecting portions.

13. A centering device for guided transfer of bars from a feeder to a late, that is interposable between the feeder and the lathe in alignment with a bar guide of the feeder and with a mandrel of the lathe, the device comprising: a supporting structure which is constantly aligned with an opening of the lathe from which a bar enters therein, with a bar guide of the feeder, and with a mandrel of the lathe; a bush element for fixing to a fixing seat which is rigidly coupled to said supporting structure; a substantially tubular body, which is rigidly coupled to said bush element, coaxial thereto and is provided with a housing seat, fixed anchoring elements supported by said tubular body; elastic means; elastic positioning elements acting between said bush element and said tubular body; and a ring accommodated in said seat and comprising oscillating elements, which are each pivoted to a respective one of said fixed anchoring elements with a first end thereof and are retained in mutual contact by said elastic means so as to delimit a through opening whose diameter is substantially as long as and in any case not smaller than a diameter of a bar to be transferred, said ring and said fixed anchoring elements being axially movable within said housing seat, by forcing at least one of said elastic positioning elements for positional movement of said ring and anchoring elements from a bottom of said housing seat toward the lathe, wherein said oscillating elements are substantially shaped like tiles that are pivoted at the respective first end which is opposite with respect to a second end which is provided with a protrusion, a terminal region of the oscillating elements located beyond said protrusion providing a, shaped opening which is substantially formed by circular sectors delimited between respective linear connecting portions, and wherein said elastic means is constituted by an elastic annular body, which is mounted on said ring comprising said oscillating elements in a respective groove provided on an outer side of the ring proximate to the terminal end thereof.

* * * * *